United States Patent [19]
Fujita et al.

[11] Patent Number: 5,701,576
[45] Date of Patent: Dec. 23, 1997

[54] MANUFACTURING METHOD OF PLASTICALLY FORMED PRODUCT

[75] Inventors: Makoto Fujita, Higashihiroshima; Yukio Yamamoto, Hiroshima; Nobuo Sakate, Hiroshima; Shoji Hirabara, Hiroshima, all of Japan

[73] Assignee: Mazda Motor Corporation, Hiroshima-ken, Japan

[21] Appl. No.: 589,145

[22] Filed: Jan. 22, 1996

Related U.S. Application Data

[63] Continuation of Ser. No. 253,789, Jun. 3, 1994, abandoned.

[30] Foreign Application Priority Data

| Jun. 3, 1993 | [JP] | Japan | 5-157877 |
| Sep. 16, 1993 | [JP] | Japan | 5-253701 |
| Mar. 8, 1994 | [JP] | Japan | 6-036853 |

[51] Int. Cl.$^6$ ................................. B22F 1/00
[52] U.S. Cl. ............... 419/29; 419/41; 419/44; 148/406; 148/420; 75/249
[58] Field of Search .................. 419/29, 38, 41, 419/44; 148/406, 420; 75/249

[56] References Cited

U.S. PATENT DOCUMENTS

| 4,732,610 | 3/1988 | Hildeman et al. | 75/249 |
| 4,770,848 | 9/1988 | Ghosh et al. | 419/28 |
| 4,938,809 | 7/1990 | Das et al. | 148/406 |
| 5,078,807 | 1/1992 | Chang et al. | 148/11.5 M |
| 5,129,960 | 7/1992 | Chang et al. | 419/67 |
| 5,136,598 | 8/1992 | Chang et al. | 148/420 |

FOREIGN PATENT DOCUMENTS

| 1279701 | 1/1990 | Japan | B22F 3/24 |

OTHER PUBLICATIONS

Hidemiki Matsumoto, Method for Extruding Powder Metallurgical Material, Japanese Publication No. 2-182806, Japanese dated Jul. 17, 1990.

S. Kalpakjian; Manufacturing Processes for Engineering Materials, p. 706, Addison Wesley.

J. Schey; Introduction to Manufacturing Processes 2nd Ed., p. 134, McGraw Hill.

*Primary Examiner*—Charles T. Jordan
*Assistant Examiner*—Anthony R. Chi
*Attorney, Agent, or Firm*—Fish & Richardson P.C.

[57] ABSTRACT

The manufacturing method of plastically formed products prevents the generation of cracks at the time of plastic working, thereby increasing the productivity. It is also prevented that the metallic particles constituting the product become large and rough in structure. In the manufacturing method, only the compact treatment and the vacuum deaeration treatment are carried out prior to the extrusion treatment, without the pressure-heat treatment performed. Therefore, processing steps prior to the extrusion treatment are simplified, so that the productivity of the plastically formed products is improved and the metallic particles are prevented from being large and rough. The diffusion treatment between the extrusion treatment and the forging treatment enhances the adhesion at the inner part of the extruded material in the radial direction, whereby the generation of cracks at the time of plastic working is avoided.

42 Claims, 13 Drawing Sheets

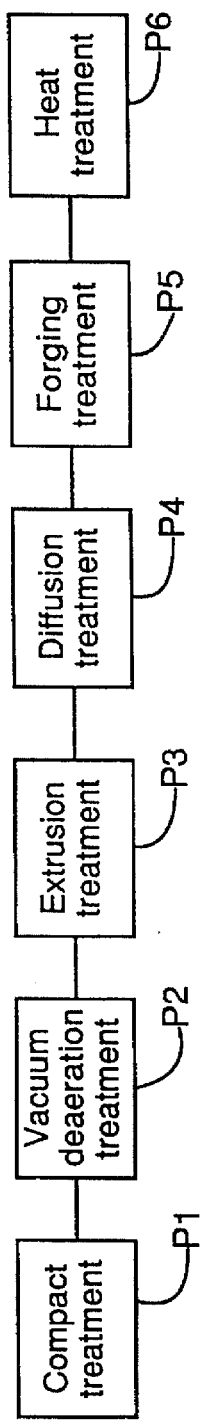
*Fig.1A* Process according to the present invention (1)
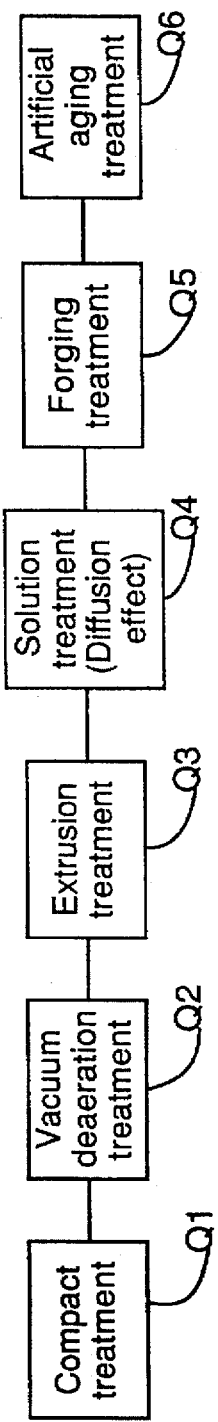
*Fig.1B* Process according to the present invention (2)
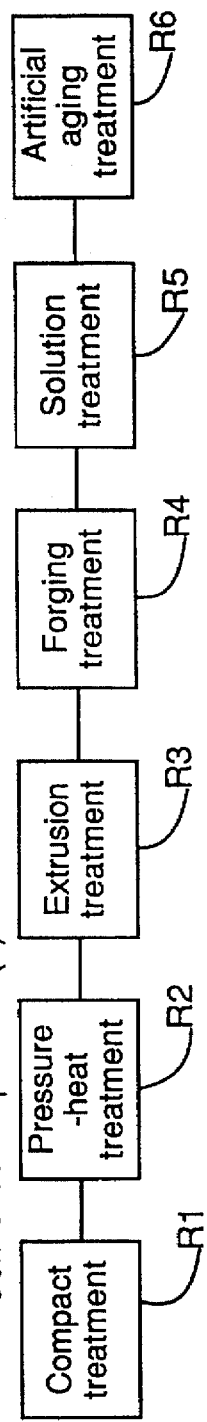
*Fig.1C* Conventional process (1)
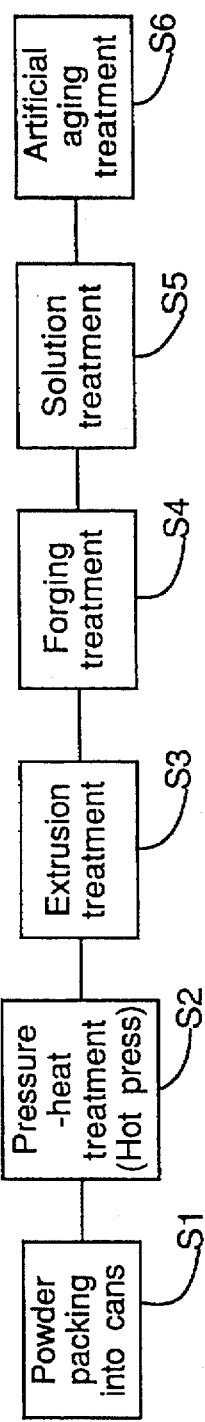
*Fig.1D* Conventional process (2)

MANUFACTURING METHOD OF PLASTICALLY FORMED PRODUCT

This application is a continuation of U.S. application Ser. No. 08/253,789, filed Jun. 3, 1994, now abandoned.

BACKGROUND OF THE INVENTION

1. Field of the Invention

The present invention relates to a manufacturing method of plastically formed products.

2. Description of the Prior Art

It has been widely known as disclosed in the published specification of Japanese Patent Laid-Open Publication No. 2-182806 (182806/1990) to form a rod-like extruded material by processing and extruding metallic particles. The extruded material is molded into products afterwards by plastic working such as forging or the like.

Since the rod-shaped extruded material is hard to receive the shearing stress in the extruding direction at the radial inner part thereof, the part shows poor adhesive properties, and therefore easily cracks when the material is processed, e.g., by forging.

For instance, according to the conventional extrusion method as revealed in the aforementioned prior art No. 2-182806, generally, metallic particles are pressured and heated before being extruded. More specifically, the metallic particles are subjected to a sintering treatment including a compact treatment step R1 and a pressure-heat treatment step R2 as shown in FIG. 1(c) (steps R1–R6) or, a hot press treatment including a pressure-heat treatment step S2 as shown in FIG. 1(d) (steps S1–S6) is executed to the metallic particles filled in a can.

In general, however, the above sintering or hot press treatment should be carried out on every required quantity of metallic particles for one extrusion step (batch process), and therefore the productivity is disadvantageously lowered. In the case where a material of low value such as chips or cutting wastage is to be used as the metallic particles, the sintering or hot press treatment invites a great increase of manufacturing costs.

Moreover, when the metallic particles are sintered before being extruded, the structure of the metallic particles is undesirably changed to be rough and large.

SUMMARY OF THE INVENTION

The object of the present invention is therefore to provide a manufacturing method of plastically formed products which can prevent the generation of cracks at the time of plastic working, enhance productivity and prevent the metallic particles from becoming large and rough.

In order to achieve the aforementioned object, according to a manufacturing method of plastically formed products in a first aspect of the present invention, metallic particles are extruded thereby to form an extruded material which is then plastically molded. The manufacturing method features a diffusion treatment of the metal of the extruded material which is executed between the extrusion and plastic working of the metallic particles.

A manufacturing method of plastically formed products according to a second aspect of the invention is characterized in that the metallic particles are pressured and vacuum deaerated before being extruded in the manufacturing method of the above first aspect.

In a manufacturing method of plastically formed products of a third aspect of the invention, prior to the extrusion of metallic particles according to the method of the second aspect, the metallic particles are not treated through the pressure-heat treatment.

In a fourth aspect of the present invention, the metallic particles in the manufacturing method of any one of the first through third aspects of the invention are chips of magnesium alloy.

A fifth aspect of the present invention provides a manufacturing method of plastically formed products characterized in that the diffusion treatment in the manufacturing method of the fourth aspect of the invention is carried out for 4–16 hours in the temperature range of 300°±50° C.

According to a sixth aspect of the present invention, there is provided a manufacturing method of plastically formed products which is characterized in that the diffusion treatment works also as a solution treatment in the manufacturing method in any one of the first through fourth aspects of the invention.

In a seventh aspect of the present invention, metallic particles are extruded with a low extrusion ratio to form an extruded material and, the extruded material is again extruded after being subjected to the diffusion treatment in accordance with the manufacturing method of the fifth or sixth aspect of the invention.

An eighth aspect of the present invention is a manufacturing method of plastically formed products which features a solution treatment with a diffusion effect, in place of the diffusion treatment in the manufacturing method of any one of the first through fourth aspects.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 1(a) and 1(b) are diagrams explanatory of processing steps in a first embodiment of the present invention;

FIGS. 1(c) and 1(d) are diagrams explanatory of processing steps in a conventional method;

DETAILED DESCRIPTION OF THE PREFERRED EMBODIMENTS

Figure 2:
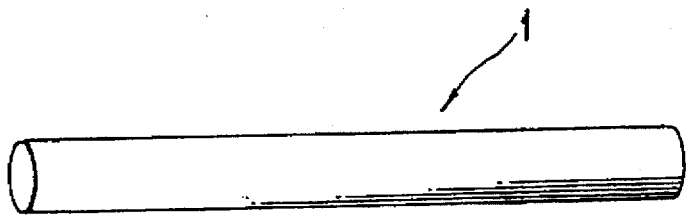
FIG. 2 is a perspective view of the appearance of an extruded material in the first embodiment.

Preferred embodiments of the present invention will be discussed hereinbelow.

<First embodiment>

FIGS. 1–8 show a first embodiment of the present invention. It is to be noted here, however, that FIGS. 1(c) and 1(d) indicate conventional processes, not representing the steps of the first embodiment to be described below.

As shown in FIG. 1(a) (steps P1–P6), the first embodiment is characterized fundamentally in steps P1–P3. More specifically, metallic particles are processed through a compact treatment (step P1) and a vacuum deaeration treatment (step P2) and then extruded (step P3). That is, a pressure-heat treatment is not executed on the metallic particles before the extrusion of the metallic particles. Therefore, each step prior to the extrusion of the particles is simplified (enabled at room temperatures) and the manufacturing cost of forging products is decreased. Moreover, the metallic particles are prevented from being large and rough.

Referring to FIG. 1(a), a heat treatment (step P6) subsequent to a forging treatment (step P5) may include both a solution treatment and an artificial aging treatment, or either one of these treatments.

Further, the first embodiment of the manufacturing method is characterized in a diffusion treatment (step P4) between the extrusion treatment (step P3) and forging treatment (step P5). Therefore, although the pressure-heat treatment is not performed before the metallic particles are extruded, the adhesion of the metallic particles in the extruded material is enhanced, so that the quality of the extruded material as a material for forging is improved.

Even if the pressure-heat treatment is conducted before the extrusion treatment as in the conventional example (with reference to FIGS. 1(c) and 1(d)), needless to say, a diffusion treatment to the extruded material after the extrusion treatment is effective to increase the adhesive properties of the metallic particles. Therefore, the diffusion treatment may be carried out after the metallic particles are processed through the extrusion treatment in the conventional manufacturing method.

As shown in FIG. 1(b) (steps Q1–Q6), a solution treatment with a diffusion effect may be performed (step Q4) in place of the above-described diffusion treatment (step P4). In this case alike, the metallic particles in the extruded material assume high adhesive properties. Naturally, another solution treatment is not required after the forging treatment (step Q5).

More specifically, in the first embodiment of the present invention, the extrusion treatment (step P3) is executed as shown in FIG. 1(a) so as to prepare the extruded material for forging (a kind of plastic working).

The extrusion treatment (step P3) is carried out on a green compact of metallic particles in the first embodiment.

The metallic particles are chips of magnesium alloy or the like, and chips of Mg alloy of an Al—Zn—Mn series (for instance, Al: 2.5–12 wt. %, Zn: 3.0 wt. % or less, Mn: 1.5 wt. % or less, Mg: remaining wt. %) is particularly suitable because of its high basic mechanical properties (tensile strength, etc.).

The aforementioned green compact is obtained by a known compact treatment. For example, metallic particles filled in a container for compact are compressed with 78 MPa or higher pressure at 350° C., whereby a green compact is formed.

The extrusion treatment (step P3) itself is a conventionally practiced one. For example, while a die with an opening is set on the green compact obtained in the above compact treatment, the green compact within an extrusion container is extruded from the opening of the die by means of an extrusion ram at 350° C. with the extrusion ratio of not smaller than 12. As a result, a round rod-like extruded material 1 as shown in FIG. 2 is produced.

Subsequently, the diffusion treatment P4 is carried out to the extruded material 1, as shown in FIG. 1(a).

Although the extruded material 1 receives the shearing stress in the extruding direction during the extrusion treatment, the material is hardly affected by the shearing stress at the inner part thereof in the radial direction and the metallic particles poorly adhere to each other. As such, the diffusion treatment (step P4) is performed to improve the adhesion of the metallic particles through the self-diffusion of atoms of magnesium or the like.

Since the diffusion treatment (step P4) works also as a solution treatment according to the first embodiment, the condition for the diffusion treatment is determined with the solution treatment (particularly, temperatures of the treatment) taken into consideration. Specifically, in the diffusion treatment, the extruded material is kept at 350°–420° C. for two or more hours and thereafter cooled by air. The condition of 400° C. and 6 hours is most desired.

The round rod-like extruded material 1 completing the diffusion treatment (step P4) is then sent to the forging treatment (step P5).

Figure 3:
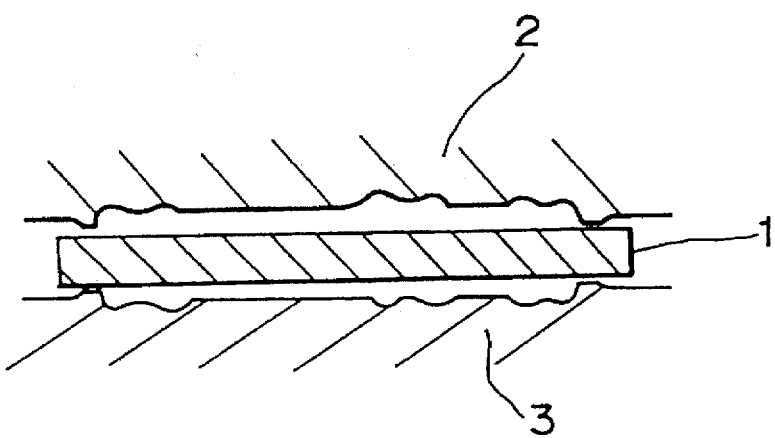
FIG. 3 is a diagram explanatory of forging.
Figure 4:
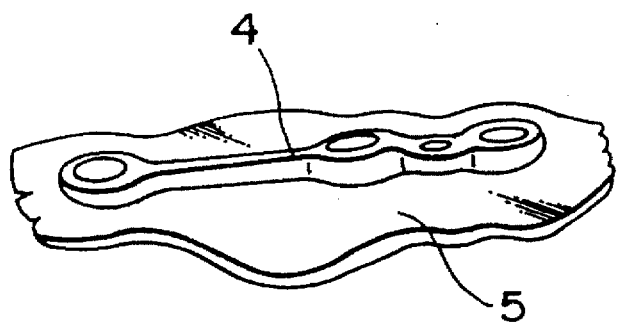
FIG. 4 is a perspective view of a formed object resulting from forging of the extruded material in the first embodiment.

The forging treatment consists of preforming and finish forging. The preforming is, as indicated in FIG. 3, made by an upper preforming mold 2 and a lower preforming mold 3. Meanwhile, an upper finish forging mold and a lower finish forging mold (not shown) are used for the finish forging. Through the forging treatment (step P5), the extruded material 1 is formed to a product with a product portion 4 (a suspension arm in the first embodiment) and a flash portion 5 as in FIG. 4. The flash portion 5 is removed afterwards by trimming, so that a forging product (product portion 4) is left.

In this case, the inner part of the extruded material 1 in the radial direction becomes the product portion 4. Owing to the diffusion treatment (step P4) precedent to the forging treatment (step P5), the adhesion of metallic particles is greatly improved, and therefore the product portion 4 does not generate cracks.

Then, the forging product is processed in the heat treatment step (step P6) (in the embodiment, only the artificial aging treatment is conducted). The artificial aging treatment (step P6) is, as is well known, intended to stabilizing the forging product, that is, keeps the forging product at 175°–220° C. for 4–16 hours and cools the same by air thereafter.

The metallic particles are matured to a product of high strength with no cracks through the above-described steps P1-P6. As is apparent from the comparison of the present embodiment with the conventional method shown in FIGS. 1(c) and 1(d), the product is realized without increasing the number of processing steps.

Figure 5:
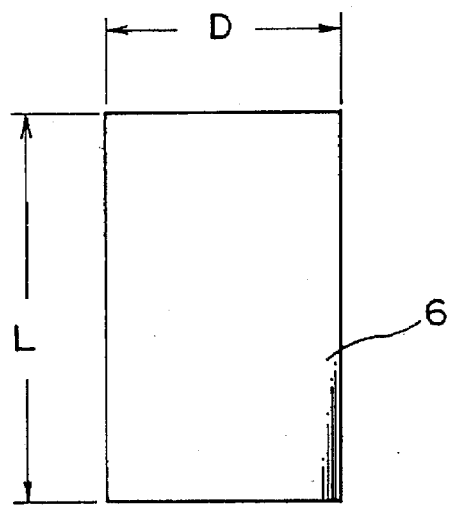
FIG. 5 is a front elevational view of a test piece in the first embodiment of the present invention.

The upsetting test has been conducted in order to verify the effect of the invention by means of circular cylindrical test pieces 6 as shown in FIG. 5, in accordance with the first embodiment and comparison examples.

* Test Pieces in Accordance with the First Embodiment

The extruded material is processed according to the process of FIG. 1(b), including the step of solution treatment with diffusion effect.

(i) Metallic particles for forming the extruded material: chips of Mg alloy (AZ80).

(ii) Condition for extrusion treatment: 12 or higher extrusion ratio at 350° C.

(iii) Condition for diffusion treatment: cooled by air after being left for 6 hours at 400° C.

(iv) Two kinds of test pieces are prepared. A first test piece is obtained from the central part of the extruded material in the radial direction, while a second test piece is obtained from the outer peripheral part outside the central part in the radial direction of the extruded material.

(v) Shape: circular cylinder having 24 cm length in the axial direction and 16 cm diameter.

* Test Pieces of Comparison Examples

The extruded material is not subjected to the diffusion treatment, but all the other treatments are performed similar to the first embodiment.

Figure 6:
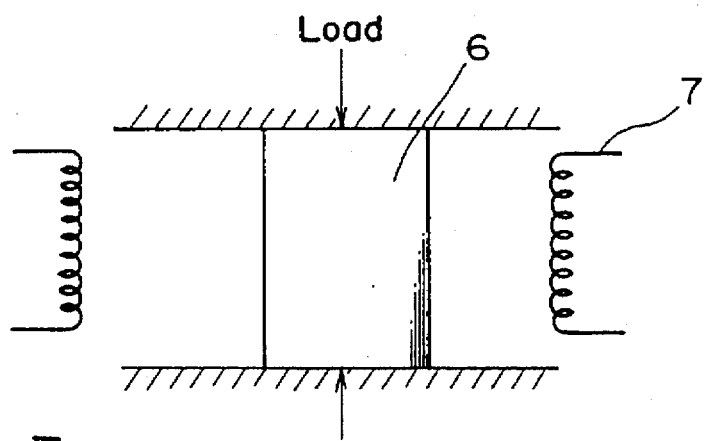
FIG. 6 is a diagram explanatory of the upsetting test to the test piece.
Figure 7:
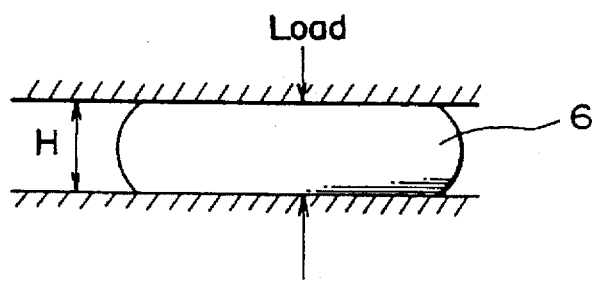
FIG. 7 is a diagram indicating the working state from FIG. 6.

* Upsetting Test (1) While the load is impressed from up and down to each test piece 6 as shown in FIG. 6, the distance H when the test piece 6 starts to crack as shown in FIG. 7 is measured. A reference numeral 7 in FIG. 6 indicates a heater. The critical upsetting ratio S of the test piece is calculated from the distance H according to the following expression;

$$S=\{(L-H)/L\}\times 100 \ (\%)$$

In the above expression, L denotes the original length (24 cm) of the test piece in the axial direction.

(2) Upsetting temperature: 300° C.

Figure 8:
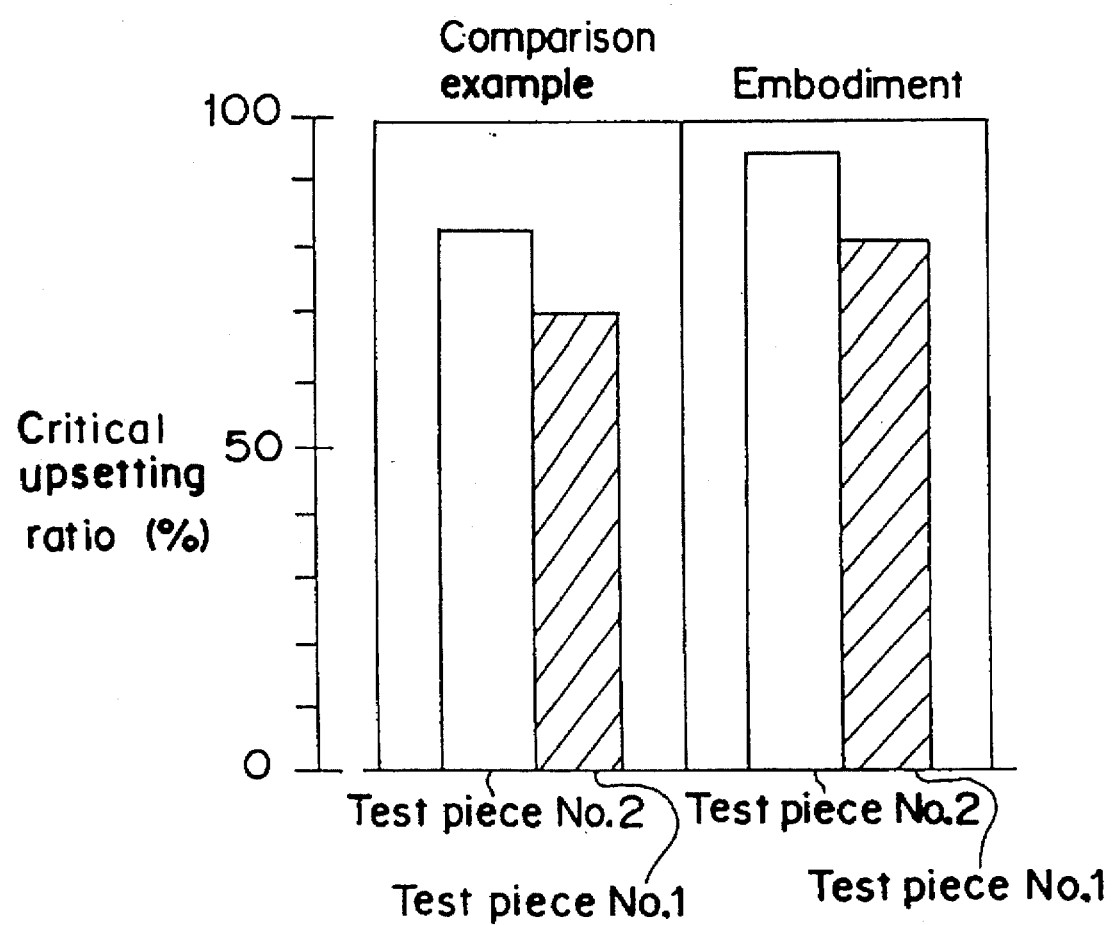
FIG. 8 is a diagram of the result of the upsetting test in the first embodiment.

The result of the above experiments is shown in a diagram of FIG. 8.

As is understood from FIG. 8, the first and second test pieces of the first embodiment show larger critical upsetting ratios S than those of the comparison examples, that is, test pieces according to the first embodiment are superior to the comparison examples in terms of the adhesive properties of the metallic particles.

Particularly, it is noteworthy that the critical upsetting ratio S of the first test piece of the first embodiment is so much improved and raised to the same value as that of the second test piece of the comparison example.

<Second embodiment>

A second embodiment of the present invention is indicated in FIGS. 9–20.

When the metallic particles are chips, especially, chips of Mg (Mg alloy), the extruded material has not enough compactability as a material for forging even if the compact (green compact) of chips is extruded. The second embodiment is devised under the circumstances.

Figure 9:
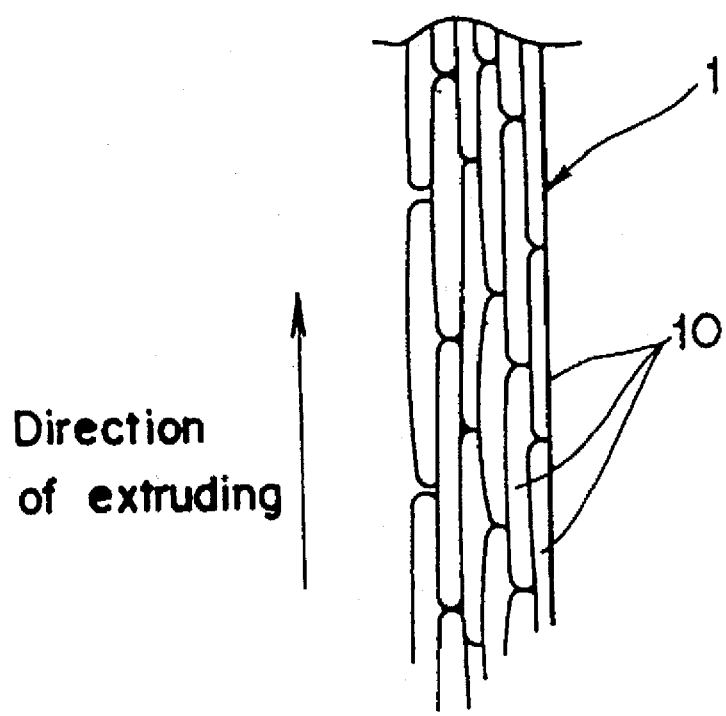
FIG. 9 is a partial sectional view of the extruded material before a heat treatment.

Mg chips are formed into needle-like small pieces through the shearing work, and after the extrusion treatment of the compact of Mg chips, the extruded material 1 has the needle-like small pieces 10 orientated in the extruding direction as is clearly shown in FIG. 9. Therefore, the interface is fragile (adhered poorly) and easy to delaminate.

In order to improve the above poor adhesion of the small pieces 10 orientated in the extruding direction, according to the second embodiment, the extruded material 1 is processed through the heat treatment in the temperature range not causing the structural change, preferably 300°±50° C. (for 4–16 hours), thereby inviting the diffusion at the surface of the small pieces 10 and improving the adhesion.

The effect of the above treatment has been verified by the upsetting test of test pieces produced in accordance with the condition of Table 1 below.

TABLE 1

|  | Vacuum deaeration treatment | Heat treatment |
| --- | --- | --- |
| Test piece A | present | present |
| Test piece B | present | absent |
| Test piece C | absent | present |
| Test piece D | absent | absent |

In Table 1 above, the term "present" of the vacuum deaeration treatment means that the vacuum deaeration treatment is incorporated in the forging step of the extruded material. Specifically, the extruded material is produced in the following manner.

Figure 10:
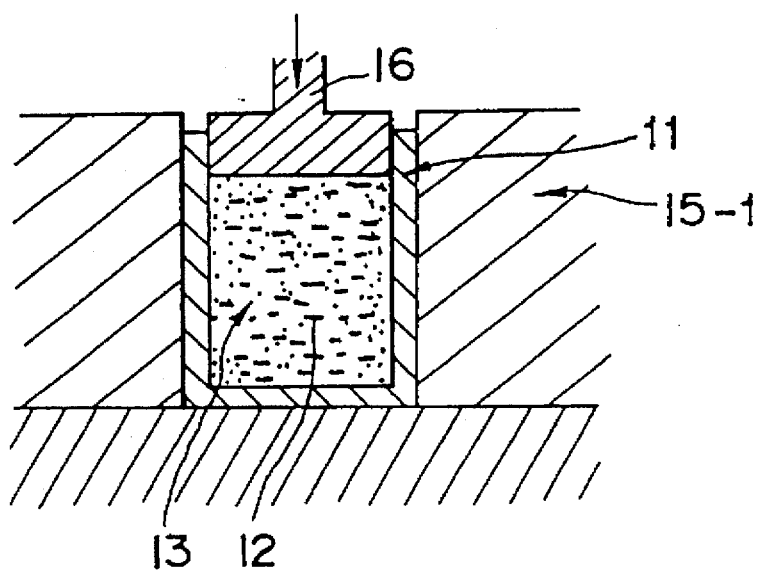
FIG. 10 is a diagram explanatory of a compact treatment.

First, as shown in FIG. 10, Mg chips 12 are supplied into an aluminum can 11 in a container 15-1, compressed with 300 MPa pressure by a ram 16 at room temperatures, thereby forming a green compact 13 (compact treatment).

In this case, chips obtained in the lathe work of AZ80 according to A.S.T.M. shown in Table 2 below are employed for the Mg chips 12.

TABLE 2

|  | Al | Zn | Mn | Si | Cu | Ni | Fe | Mg |
| --- | --- | --- | --- | --- | --- | --- | --- | --- |
| AZ80 (wt. %) | 8.3 | 0.52 | 0.15 | 0.012 | 0.005 | 0.001 | 0.004 | Bal. |

Figure 11:
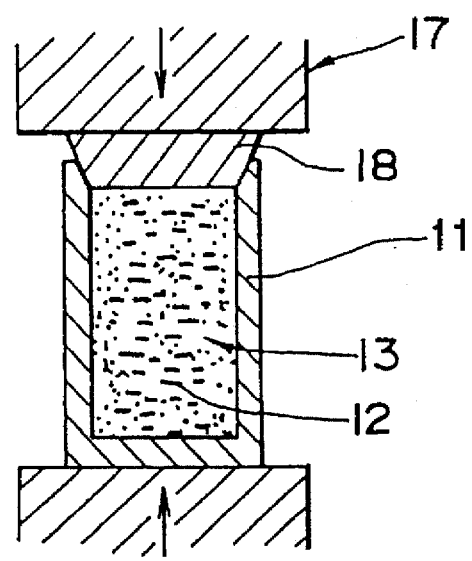
FIG. 11 is a diagram explanatory of a step wherein a can is closed and a vacuum hot press treatment is carried out.

Thereafter, as shown in FIG. 11, the aluminum can 11 is sealed with an aluminum lid 18 by a pressing member 17 or the like and vacuum extracted to $1\times10^{-1}$Pa at room temperatures (tight sealing of can).

Figure 12:
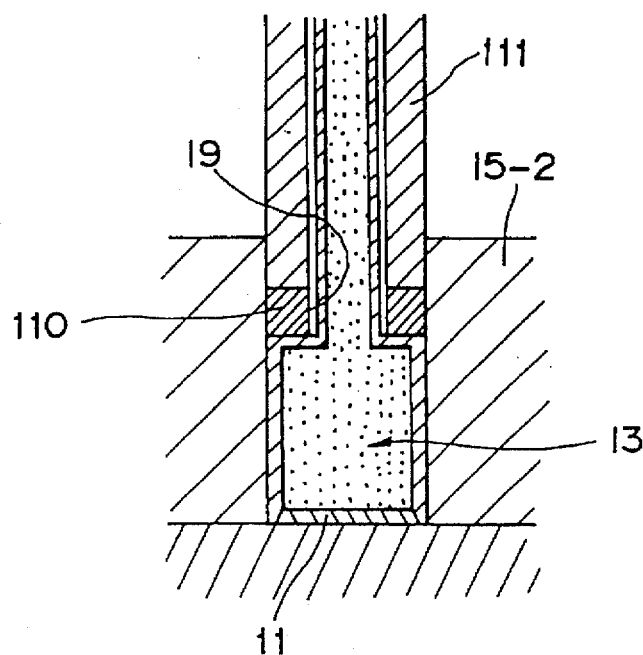
FIG. 12 is a diagram explanatory of an extrusion treatment step following the step of FIG. 11.
Figure 13:
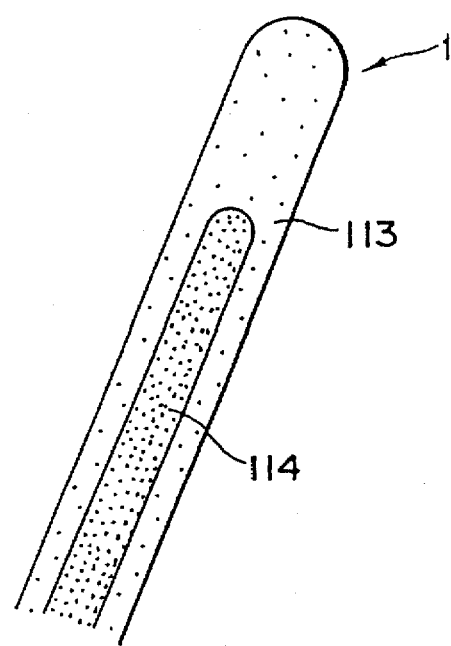
FIG. 13 is a diagram showing an extruded material obtained in FIG. 12.

Then, as shown in FIG. 12, a die 110 with an opening 19 is placed on the sealed aluminum can in an extrusion container 15-2. The green compact 13 within the aluminum can 11 is extruded along with the aluminum can 11 from the opening 19 (extrusion treatment) by an extrusion ram 111 at 350° C. with 8 extrusion ratio. As a result, the round rod-like extruded material 1 of FIG. 13 is obtained. A reference numeral 113 of the extruded material 1 in FIG. 13 is formed of the aluminum can 11, and a reference numeral 114 is a part formed of the green compact 13.

In the meantime, the term "absent" in Table 1 indicates that the vacuum deaeration treatment is not carried out in the manufacturing process of the extruded material.

Figure 14:
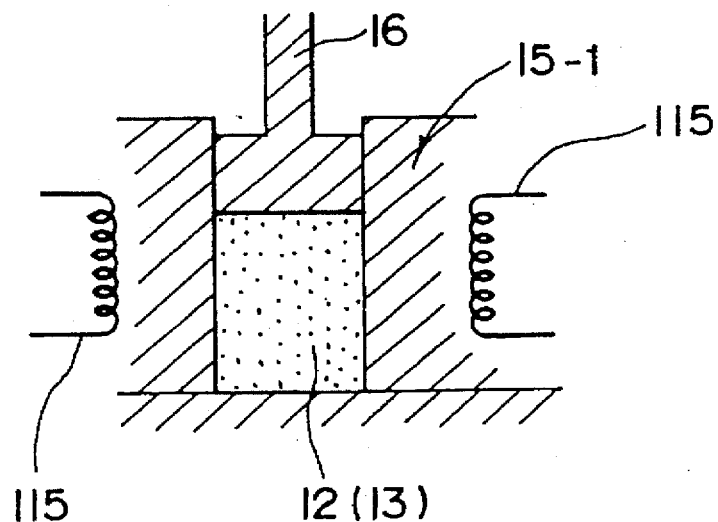
FIG. 14 is a diagram explanatory of another compact treatment step.

In an example of the manufacturing process without the vacuum deaeration treatment is included such a compact treatment as shown in FIG. 14 wherein the green compact 13 is formed by compressing Mg chips 12 put in the container 15-1 with 300 MPa pressure by the ram 16 at room temperatures.

In the example of FIG. 14 also, chips collected in the lathe work of AZ80 according to A.S.T.M. are used as Mg chips 12, similar to the manufacturing method of the extruded material described earlier.

Figure 15:
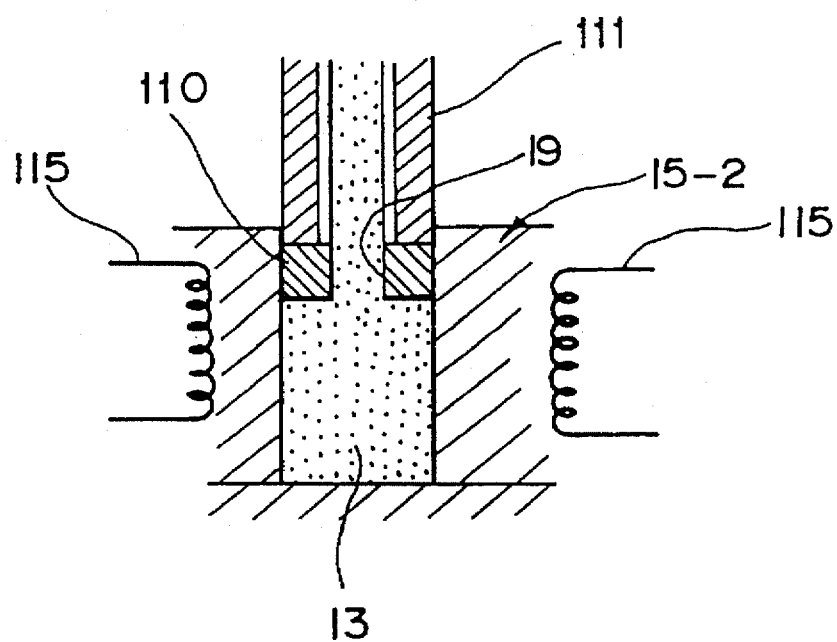
FIG. 15 is a diagram of an extrusion treatment step subsequent to the compact treatment step of FIG. 14.
Figure 16:
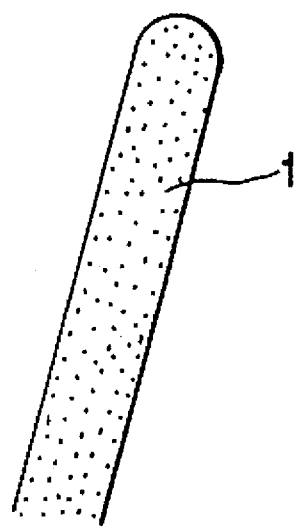
FIG. 16 is a diagram of an extruded material obtained in FIG. 15.

Subsequently, as shown in FIG. 15, the die 110 with the opening 19 is set on the green compact 13 in the extrusion container 15-2 to extrude the green compact 13 through the opening 19 at 350° C. with 8 extrusion ratio by the extrusion ram 111 (extrusion treatment). The round rod-like extruded material 1 as shown in FIG. 16 is thus obtained.

In FIGS. 14 and 15, a reference numeral 115 indicates a heater.

"Present" in the heat treatment in Table 1 stands for the fact that the extruded material 1 is subjected to the heat treatment, specifically, at 300° C. for 8 hours in the instant experiments.

On the other hand, "absent" in Table 1 shows that the extruded material 1 is not thermally treated.

For test pieces, circular cylindrical test pieces with 9.2 mm diameter and 13.8 mm length are selected under the condition in accordance with Table 1.

Figure 17:
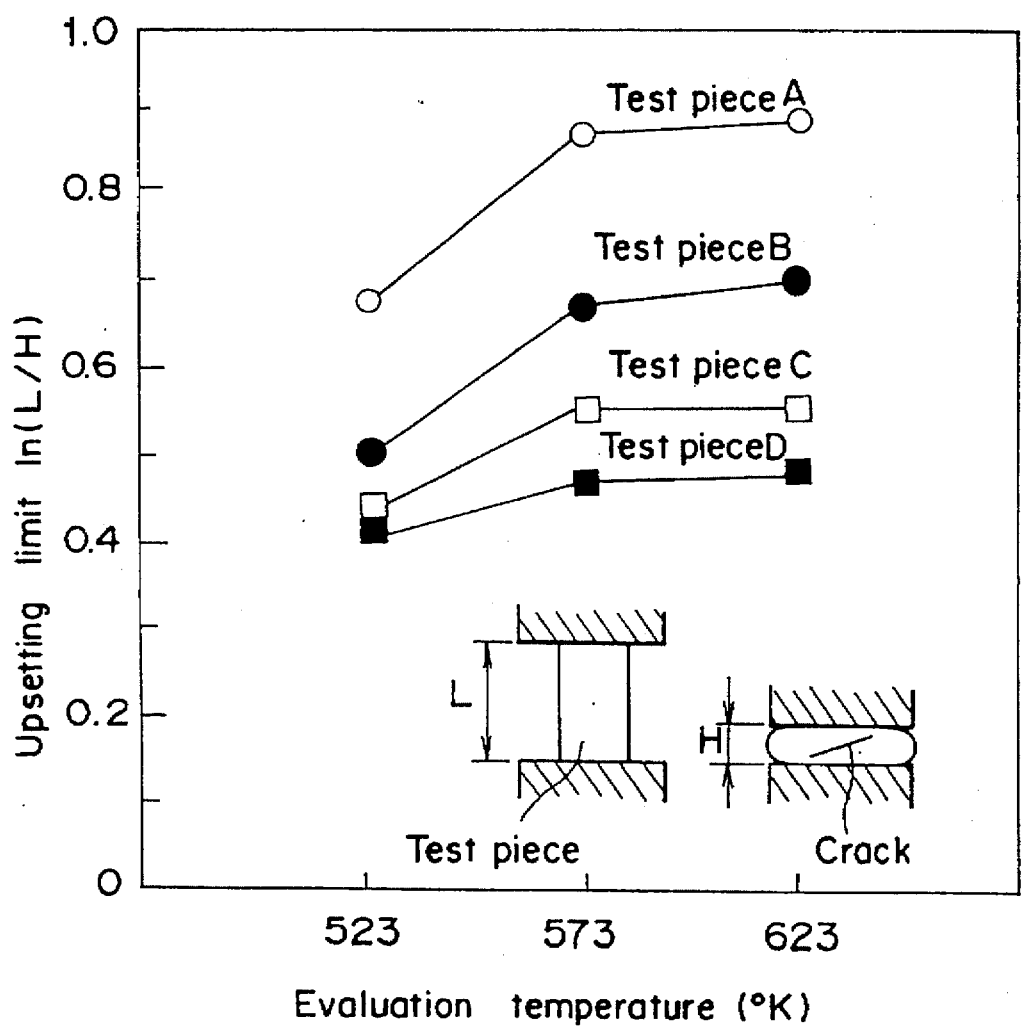
FIG. 17 is a diagram showing the evaluating result of the upsetting compactibility of each test piece in a second embodiment of the present invention.

In the upsetting test, the distance H when each test piece starts to crack is measured while the evaluation temperature (upsetting temperature) is changed, as shown in FIG. 17. The upsetting limit in (L/H) is calculated from the distance H and the original axial length L of the test piece.

The result of the upsetting test is shown in FIG. 17. It is detected by comparing the test piece D with the test pieces A, B and C that the heat treatment is quite effective to enhance the compactibility.

Fractured surfaces of test pieces are observed to further study the aforementioned fact.

Figure 18:
FIG. 18 is a photograph by a scanning electron microscope showing the metallic structure of a fractured face of a test piece B after the upsetting test processed through a vacuum deaeration treatment.
Figure 19:
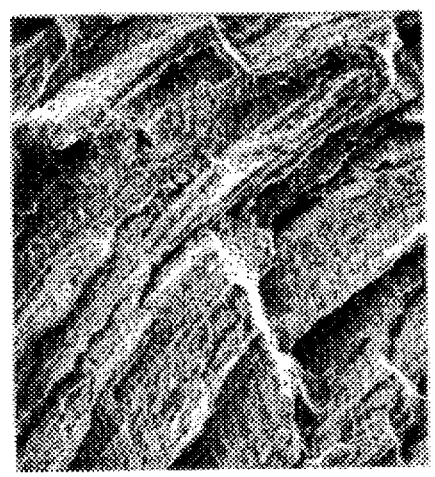
FIG. 19 is a photograph by a scanning electron microscope showing the metallic structure of a fractured face of a test piece A after the upsetting test of the test piece A undergoing the vacuum deaeration treatment and heat treatment.

FIG. 18 is a photograph (SEM) of a fractured surface of the test piece B after the upsetting test which is obtained by a scanning electron microscope. The test piece B undergoes the vacuum deaeration treatment. FIG. 19 is a scanning electron microscope photograph (SEM) of a fractured surface of the test piece A after the upsetting test. The test piece A is treated by both the vacuum deaeration treatment and the heat treatment. The apparent length of 8 mm corresponds to 100 µm in each photograph.

The needle-like small pieces of chips appear to be connected and bound through the shearing work. Although the small pieces are orientated in the extruding direction by the extrusion treatment, the small pieces are separated at the interface in the test piece B (FIG. 18), whereas no interfacial delamination of small pieces is observed in the test piece A (FIG. 19). Therefore, the reason why the test piece A shows superior compactibility is considered to reside in the improvement of the adhesive properties at the interface of chips as a result of the diffusion of the metal.

The test piece A has been furthermore tested under different conditions of the heat treatment.

Figure 20:
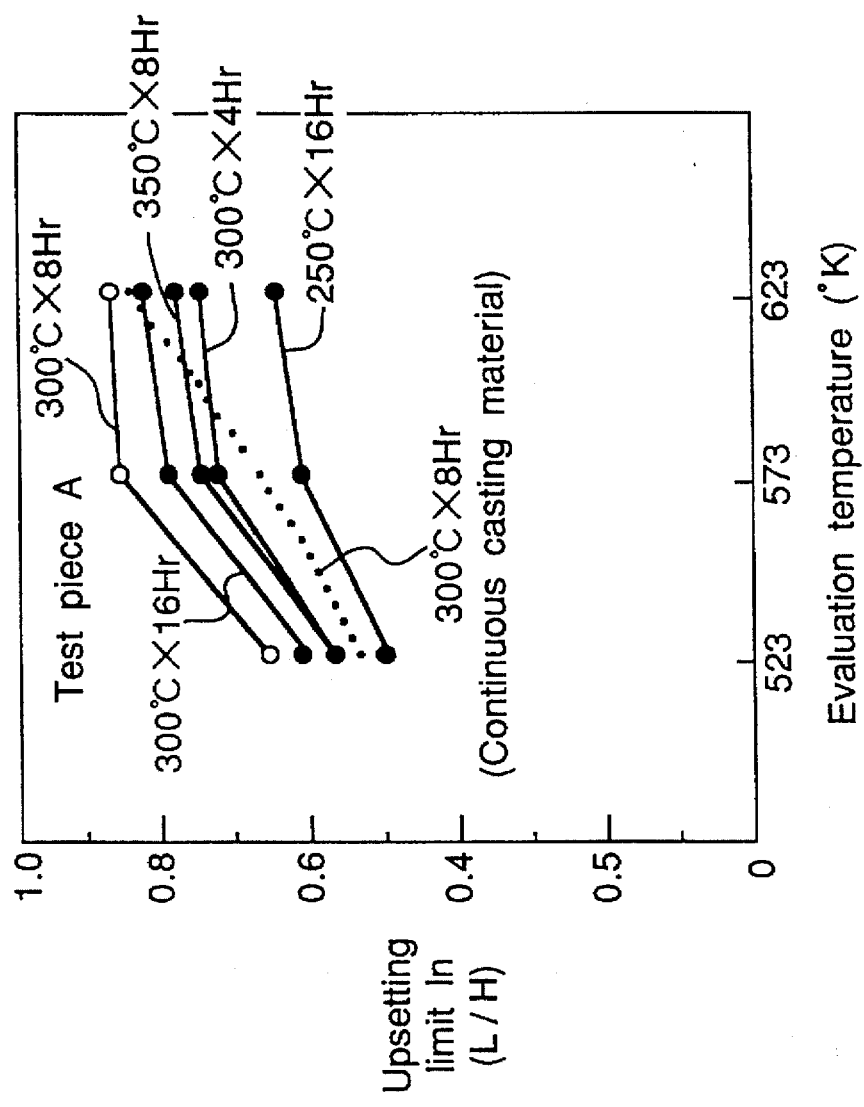
FIG. 20 is a diagram showing the upsetting limit of the test piece A when the condition for the heat treatment is changed.

The result is indicated in FIG. 20. In comparison with a continuous casting material (indicated by a broken line in FIG. 20, processed by the heat treatment at 300° C. for 8 hours), the effective condition for the heat treatment to improve the adhesion is found to be 300° C.±50° C. for 4–16 hours.

The upsetting limit in FIG. 20 is obtained in the same manner as in FIG. 17.

<Third embodiment>

Figure 21:
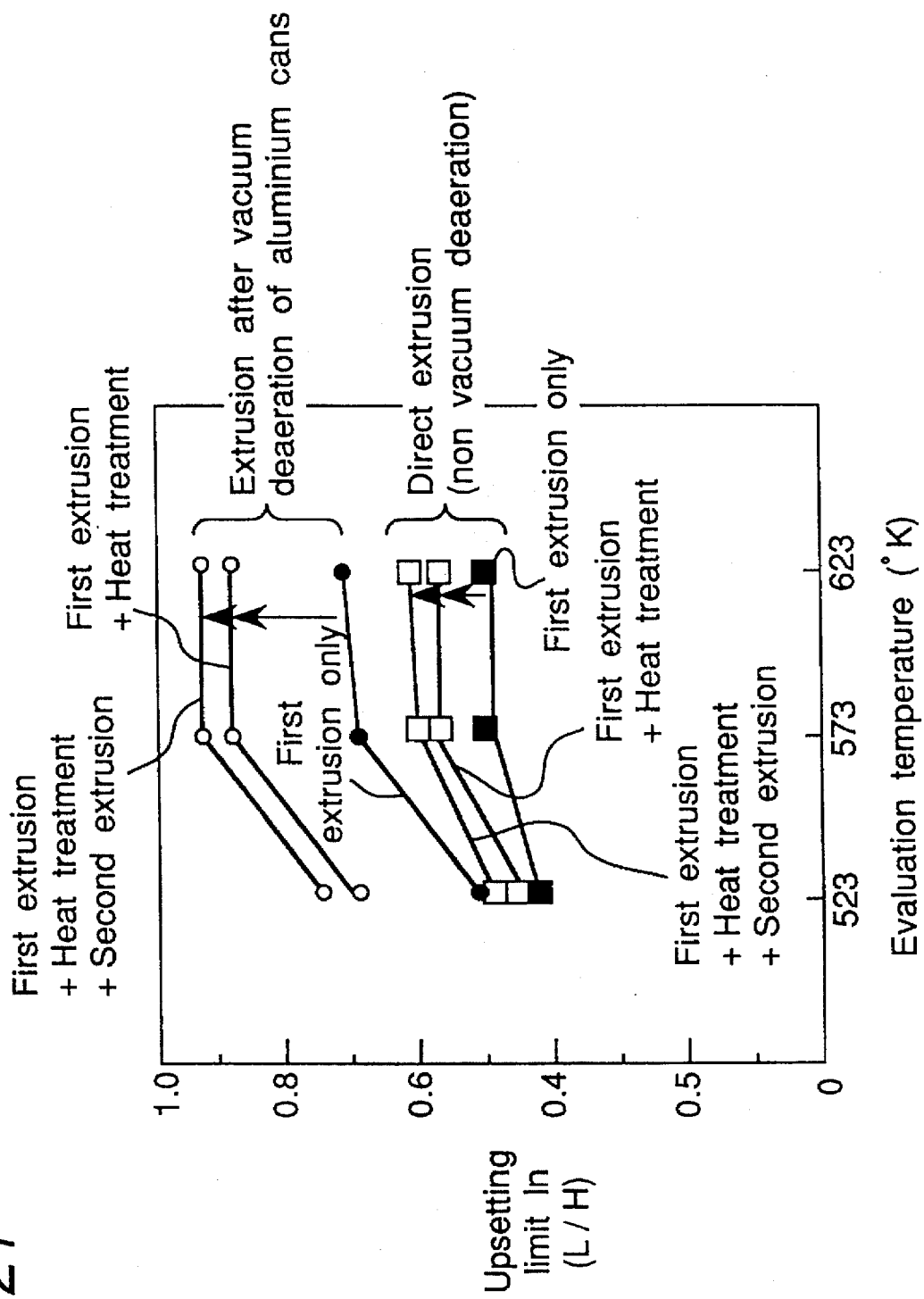
FIG. 21 is a diagram of the evaluating result of the upsetting compactibility in accordance with a third embodiment of the present invention.

FIG. 21 represents a third embodiment of the present invention.

Although the Mg chips of the extruded material adhere each other better as the extrusion ratio is larger, the anisotropy is undesirably increased, changing the extruded material not to be fit for a material for forging.

Therefore, in the third embodiment, the extrusion treatment is repeatedly carried out, e.g., via the heat treatment with the extrusion ratio as small as not higher than 10, thereby completing a material with high compactibility.

The first extrusion treatment may be performed either after the vacuum deaeration treatment or without the vacuum deaeration treatment, similar to the foregoing second embodiment. At the same time, the heat treatment is held within the same range as in the second embodiment, and the extrusion treatment after the heat treatment is done at 200°–420° C.

The effect has been proved through the upsetting test.

The testing condition is as follows;

(1) AZ80 by A.S.T.M. is used as Mg chips.

(2) Condition for the first extrusion treatment: the first extrusion treatment is conducted for two kinds of material, i.e., one undergoing the vacuum deaeration treatment and the other not processed through the vacuum deaeration treatment as in the second embodiment, and under the same condition as in the second embodiment with 8 extrusion ratio.

(3) Condition for heat treatment: at 300° C. for 8 hours.

(4) Condition for the extrusion treatment subsequent to the heat treatment: at 350° C. with 8 extrusion ratio.

FIG. 21 shows the result of the upsetting test. As is apparent from FIG. 21, whether the vacuum deaeration treatment is present or not before the first extrusion treatment, the extrusion treatment twice raises the upsetting limit, and it is effective for enhancing the compactibility to repeat the extrusion treatments with the low extrusion ratio.

The upsetting limit in FIG. 21 is detected in the same fashion as in the case of FIG. 17.

As is fully depicted hereinabove, according to the first aspect of the present invention, the diffusion treatment is performed to the extruded material between the extrusion treatment and plastic working. The binding force of the metallic particles of the extruded material is increased because of the diffusion treatment, whereby the adhesive properties of the metallic particles are improved as a whole including the inner part in the radial direction of the extruded material. Therefore, since the plastic working is executed to the extruded material having the improved adhesion properties, the generation of cracks which would be caused when the adhesion properties of the metallic particles of the extruded material are inferior is prevented.

According to the second aspect of the present invention, fundamentally, the same operation and effect as in the first aspect of the invention are achieved. Moreover, since the metallic particles are processed by the extrusion treatment after the compact treatment and vacuum deaeration treatment, each treatment before the extrusion process is simplified, reducing the manufacturing cost. At the same time, it is prevented that the metallic particles become large and rough.

The same operation and effect as in the second aspect of the invention are basically achieved according to the third aspect of the present invention. Since the pressure-heat treatment for the metallic particles is omitted before the extrusion treatment, each step prior to the extrusion treatment can be conducted at ordinary temperatures, thus simplifying the step. Besides, it is further effectively prevented that the metallic particles become large and rough.

According to the fourth aspect of the present invention, although the same operation and effect as in any one of the first through third aspects of the invention are accomplished, the adhesive properties of the metallic particles are furthermore noticeably improved since the metallic particles are chips of Mg alloy.

In the fifth aspect of the present invention, the same operation and effect as in the above fourth aspect of the invention are substantially fulfilled. At the same time, since the diffusion treatment is performed for 4–16 hours in the temperature range of 300° C.±50° C., the improving effect of the adhesion properties of the metallic particles is increased remarkably.

According to the sixth aspect of the present invention, the same operation and effect as in any one of the first through fourth aspects of the invention are secured. Since the diffusion treatment functions also as the solution treatment, the number of steps as a whole is decreased even if the solution treatment is required, which contributes to the reduction of manufacturing costs.

According to the seventh aspect of the present invention, the same operation and effect as in the fifth or sixth aspect of the invention are achieved. Further, since the extruded material is subjected to the extrusion treatment twice via the diffusion treatment, the anisotropy of the extruded material is reduced, so that the compactibility is enhanced.

According to the eighth aspect of the present invention, the same operation and effect as in any one of the first through fourth aspects of the invention are realized. Since the solution treatment with a diffusion effect is carried out in place of the diffusion treatment, the number of processing steps is reduced while the adhesive properties of the extruded material are improved, and the manufacturing cost is decreased.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a plastically formed product by processing chips of waste metal, comprising the sequential steps of:
   (a) processing a waste metal article to produce chips of metal,
   (b) extruding said chips of metal to form an extruded material;
   (c) carrying out a diffusion treatment on said extruded material after said extruding step is completed to produce self-diffusion of metallic atoms in said extruded material, and
   (d) plastically working said extruded material to form said plastically formed product.

2. The method as defined in claim 1, further comprising compacting said chips of metal and subjecting said chips to a vacuum deaeration treatment prior to said extruding step.

3. The method as defined in claim 2, wherein no pressure-heat treatment is conducted on said chips of metal prior to said extruding step.

4. The method as defined in claim 3, wherein said chips of metal are chips of magnesium alloy.

5. The method as defined in claim 4, wherein said diffusion treatment is conducted at a temperature of 300°±50° C. for 4–16 hours.

6. The method as defined in claim 2, wherein said chips of metal are chips of magnesium alloy.

7. The method as defined in claim 6, wherein said diffusion treatment is conducted at a temperature of 300°±50° C. for 4–16 hours.

8. The method as defined in claim 7, wherein said chips of metal are extruded at a low extrusion ratio to form said extruded material, and further comprising a step of extruding said extruded material again after said carrying out of said diffusion treatment.

9. The method as defined in claim 1, wherein said chips of metal are extruded at a low extrusion ratio to form said extruded material, and further comprising a step of extruding said extruded material again after said carrying out of said diffusion treatment.

10. The method as defined in claim 1, wherein said chips of metal are chips of magnesium alloy.

11. The method as defined in claim 10, wherein said diffusion treatment is conducted at a temperature of 300°±50° C. for 4–16 hours.

12. The method as defined in claim 1, wherein said chips of metal are extruded at an extrusion ratio of 10 to form said extruded material, and further comprising a step of extruding said extruded material again after said carrying out of said diffusion treatment.

13. The method as defined in claim 1, wherein said extruding step is carried out at an extrusion ratio of 12 or greater.

14. A method of manufacturing a plastically formed product by processing chips of waste metal, comprising the sequential steps of:
   (a) processing a waste metal article to produce chips of metal,
   (b) extruding said chips of metal to form an extruded material;
   (c) carrying out on said extruded material after said extruding step is completed a solution treatment with a diffusion effect to produce self-diffusion of metallic atoms in said extruded material, and
   (d) plastically working said extruded material to form said plastically formed product.

15. The method as defined in claim 14, further comprising compacting said chips of metal and subjecting said chips to a vacuum deaeration treatment prior to said extruding step.

16. The method as defined in claim 15, wherein no pressure-heat treatment is conducted on said chips of metal prior to said extruding step.

17. The method as defined in claim 14, wherein said chips of metal are chips of magnesium alloy.

18. The method as defined in claim 15, wherein said chips of metal are chips of magnesium alloy.

19. The method as defined in claim 16, wherein said chips of metal are chips of magnesium alloy.

20. The method as defined in claim 14, wherein said extruding step is carried out at an extrusion ratio of 12 or greater.

21. A method of manufacturing a magnesium alloy-based material having good forgeability for forging by processing chips of magnesium alloy of a small needle-like shape made from waste metal, comprising the sequential steps of:

(a) processing a waste metal article containing magnesium alloy to produce chips of magnesium alloy of a small needle-like shape;

(b) compacting said chips of magnesium alloy;

(c) extruding said compacted chips to form an extruded material, said extruding step being carried out so that said chips are axially oriented in the direction of extrusion and are adhered to one another; and (d) carrying out a diffusion treatment on said extruded material after said extruding step is completed to produce self-diffusion of metallic atoms in said extruded material so as to form said material for forging, whereby said metallic atoms in a surface area of each of said oriented chips are diffused so that said chips are tightly adhered to one another in said material for forging.

22. The method as defined in claim 21, wherein said magnesium alloy comprises 2.5–12 weight percent aluminum, 3.0 weight percent or less zinc, 1.5 weight percent or less manganese and the balance magnesium.

23. The method as defined in claim 22, wherein said diffusion treatment is conducted at a temperature of 300°±50° C. for 4–16 hours.

24. The method as defined in claim 23, wherein said extruding step is performed at an extrusion ratio of 12 or greater.

25. The method as defined in claim 23, wherein said compacting step is performed at a pressure of 300 MPa or higher at room temperature.

26. The method as defined in claim 23, wherein said compacting step is performed at a pressure of 78 MPa or higher at the temperature of 350° C.

27. A method of manufacturing a magnesium alloy-based material having good forgeability for forging by processing chips of magnesium alloy of a small needle-like shape made from waste metal, comprising the sequential steps of:

(a) processing a waste metal article containing magnesium alloy to produce chips of magnesium alloy of a small needle-like shape;

(b) filling a container with said chips of magnesium alloy;

(c) compacting said chips filled in said container;

(d) sealing said container with a lid and then vacuum extracting said container;

(e) extruding said chips and said container together to form an extruded material; and (f) carrying out a diffusion treatment on said extruded material after said extruding step is completed to produce self-diffusion of metallic atoms in said extruded material to form said material for forging.

28. The method as defined in claim 27, wherein said container and said lid are made of aluminum.

29. The method as defined in claim 27, wherein said magnesium alloy comprises 2.5–12 weight percent aluminum, 3.0 weight percent or less zinc, 1.5 weight percent or less manganese and the balance magnesium.

30. The method as defined in claim 29, wherein said diffusion treatment is conducted at a temperature of 300°±50° C. for 4–16 hours.

31. The method as defined in claim 29, wherein said extruding step is carried out at an extrusion ratio of 12 or greater.

32. The method as defined in claim 29, wherein said compacting step is performed at a pressure of 300 MPa or higher at room temperature.

33. The method as defined in claim 29, wherein said compacting step is performed at a pressure of 78 MPa or higher at a temperature of 350° C.

34. A method of manufacturing a forged product by forging an extruded material which is produced by processing waste metal chips, comprising the sequential steps of:

(a) providing an extruded material which has been prepared by compacting waste metal chips and extruding said chips to form said extruded material;

(b) carrying out a diffusion treatment on said extruded material after said extruding step is completed to produce self-diffusion of metallic atoms in said extruded material to form said material for forging; and (c) forging said extruded material so as to have a predetermined shape thus to form said forged product.

35. The method as defined in claim 34, further comprising performing a step of artificial aging treatment after said forging step.

36. The method as defined in claim 34, further comprising performing steps of artificial aging treatment and solution treatment after said forging step.

37. The method as defined in claim 34, wherein the forging step comprises a preforming step and a finish forging step.

38. A method of manufacturing a magnesium alloy-based forged product by forging an extruded material which is produced by processing chips of magnesium alloy made from waste metal, comprising the sequential steps of:

(a) providing an extruded material which has been prepared by compacting said waste metal chips, extruding said chips and carrying out a diffusion treatment on said extruded material after said extruding step is completed to produce self-diffusion of metallic atoms in said extruded material to form said material for forging; and (b) forging said extruded material so as to have a predetermined shape thus to form said forged product.

39. The method as defined in claim 38, wherein said magnesium alloy comprises 2.5–12 weight percent aluminum 3.0 weight percent or less zinc, 1.5 weight percent or less manganese and the balance magnesium.

40. The method as defined in claim 39, further comprising performing a step of artificial aging treatment after said forging step.

41. The method as defined in claim 39, further comprising performing steps of artificial aging treatment and solution treatment after said forging step.

42. The method as defined in claim 40, wherein the forging step comprises a preforming step and a finish forging step.

* * * * *